(12) United States Patent
Nam et al.

(10) Patent No.: US 11,205,786 B2
(45) Date of Patent: Dec. 21, 2021

(54) FUEL CELL HAVING HEATING UNIT THEREFOR

(71) Applicants: HYUNDAI MOTOR COMPANY, Seoul (KR); KIA MOTORS CORPORATION, Seoul (KR)

(72) Inventors: Gi Young Nam, Suwon-si (KR); Suk Min Baeck, Seongnam-si (KR); Hyun Woong Ko, Seoul (KR); Ju Han Kim, Yongin-si (KR); Seung Jun Yeon, Yongin-si (KR); Ki Wook Ohm, Yongin-si (KR); Duck Whan Kim, Seongnam-si (KR); Yong Suk Heo, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 172 days.

(21) Appl. No.: 16/686,633

(22) Filed: Nov. 18, 2019

(65) Prior Publication Data

US 2020/0185732 A1    Jun. 11, 2020

(30) Foreign Application Priority Data

Dec. 7, 2018    (KR) .................. 10-2018-0156606

(51) Int. Cl.
*H01M 8/04* (2016.01)
*H01M 8/04007* (2016.01)
*H01M 8/0267* (2016.01)
*H01M 8/24* (2016.01)

(52) U.S. Cl.
CPC ..... *H01M 8/04037* (2013.01); *H01M 8/0267* (2013.01); *H01M 8/04007* (2013.01); *H01M 8/24* (2013.01); *H01M 2250/20* (2013.01)

(58) Field of Classification Search
CPC .......... H01M 8/0267; H01M 8/04007; H01M 8/04037; H01M 8/24
USPC ....................................... 429/436
See application file for complete search history.

(56) References Cited

U.S. PATENT DOCUMENTS

2004/0018406 A1*  1/2004  Herman ............. H01M 8/1226
                                                            429/143
2015/0255816 A1*  9/2015  Griffith, Jr ............. C01B 3/065
                                                            429/416
2017/0352900 A1* 12/2017  Kim .................. H01M 8/04037
2018/0020506 A1*  1/2018  Jang ................. H01M 8/04253

FOREIGN PATENT DOCUMENTS

JP        2014-049383 A       3/2014
KR   10-2018-0088095 A       8/2018

* cited by examiner

*Primary Examiner* — James M Erwin
(74) *Attorney, Agent, or Firm* — Morgan, Lewis & Bockius LLP

(57) ABSTRACT

A fuel cell includes a cell stack including a plurality of stacked unit cells and a heating unit configured to apply heat to the cell stack. The heating unit includes a heat-generating part and a heat-generating-part support part disposed on an end side of the cell stack. The heat-generating-part support part allows the heat-generating part to be fitted thereinto or to be drawn out therefrom.

19 Claims, 17 Drawing Sheets

FUEL CELL HAVING HEATING UNIT THEREFOR

CROSS-REFERENCE TO RELATED APPLICATION(S)

The present application claims the benefit of priority to Korean Patent Application No. 10-2018-0156606, filed on Dec. 7, 2018 in the Korean Intellectual Property Office, the entire disclosure of which is incorporated herein by reference.

TECHNICAL FIELD

The present disclosure relates to a fuel cell having a heating unit therefor.

BACKGROUND

In general, a fuel cell includes a polymer electrolyte membrane, and generates electricity using air supplied to one surface of the membrane and hydrogen supplied to the opposite surface of the membrane. This fuel cell serves to supply electricity to a vehicle. Studies on a heater for heating a cell stack of a fuel cell, in which a plurality of unit cells is stacked, have been conducted.

The information included in this Background section is only for enhancement of understanding of the general background of the present disclosure and may not be taken as an acknowledgement or any form of suggestion that this information forms the prior art already known to a person skilled in the art.

SUMMARY

Accordingly, embodiments are directed to a fuel cell that substantially obviates one or more problems due to limitations and disadvantages of the related art.

An object of embodiments is to provide a fuel cell enabling replacement of a heating unit with less cost and time.

In one exemplary embodiment of the present disclosure, a fuel cell may include a cell stack including a plurality of stacked unit cells, and a heating unit configured to apply heat to the cell stack. The heating unit may include a heat-generating part and a heat-generating-part support part disposed on an end side of the cell stack. The heat-generating-part support part may allow the heat-generating part to be fitted thereinto or to be drawn out therefrom, and the heat-generating part fitted into the heat-generating-part support part may be mounted in the heat-generating-part support part so as to face the end side of the cell stack.

For example, the fuel cell may further include an end plate disposed on the end side of the cell stack, and a current collector arranged between the end of the cell stack and the end plate.

For example, the heat-generating-part support part may be arranged between the end of the cell stack and the end plate.

For example, the heat-generating-part support part may be arranged between the end of the cell stack and the current collector.

For example, the heat-generating-part support part may be arranged between the end plate and the current collector.

For example, the heat-generating-part support part may be integrally formed with the end plate.

For example, the heat-generating-part support part may be integrally formed with the current collector.

For example, the heating unit may further include a power connection part connected to a driving power source, and a cover part on which the power connection part is disposed. The heat-generating part may include a planar heating element, connected to the power connection part, which generates heat in response to the driving power source. The planar heating element is disposed on the end side of the cell stack.

For example, the fuel cell may further include an enclosure surrounding at least a portion of lateral sides of the cell stack.

For example, the heating unit may further include a fixing part configured to detachably secure the cover part to at least one of the end plate, the current collector, or the enclosure. The cover part, the planar heating element, and the power connection part may be integrally movable.

For example, the enclosure may include a receiving recess formed in a periphery of the heat-generating part. The fixing part and the power connection part may extend from the cover part, and may be received in the receiving recess.

For example, the fuel cell may further include a plurality of clamping members to clamp the unit cells together with the end plate.

For example, the heating unit may further include a fixing part configured to detachably secure the cover part to the heat-generating-part support part. The cover part, the planar heating element, and the power connection part may be integrally movable.

For example, the cover part may include a through-hole extending therein, and the fixing part may include a fixing screw that is fastened to the heat-generating-part support part through the through-hole in the cover part.

For example, the cover part may include a first surface, to which the planar heating element is connected, and a second surface, which is opposite the first surface. The power connection part may be disposed on the second surface.

For example, the heating unit may further include a heat conduction part configured to conduct heat from the heat-generating part to a periphery of the heat-generating part.

For example, the heat-generating-part support part may include a first region in which the heat-generating part is mounted, the first region being disposed on the end side of the cell stack, second regions in which manifolds are disposed, second regions being opposite each other, with the first region interposed therebetween, and third regions in which the heat conduction part is disposed, each of the third regions being disposed between the first region and a respective one of the plurality of second regions.

For example, the heat conduction part may be arranged between the planar heating element and the end of the cell stack.

For example, the planar heating element may include a heater, and a heater support part surrounding at least a portion of the heater.

For example, the heater may have a film shape or a plate shape.

For example, the heater support part may include at least one of metal, ceramic, or an insulating material.

For example, the heat-generating-part support part may include a first side, on which some of the clamping bars are arranged, and a second side opposite to the first side, on which the remaining ones of the clamping bars are arranged. At least one of the first side or the second side may include at least one opening extending therein to allow the heat-generating part to be fitted thereinto or to be drawn out therefrom.

For example, the heat-generating-part support part may include a first region, in which the heat-generating part is disposed, a second region, which is disposed near the first region and in which manifolds are disposed, and a fourth region, which is interposed between the first region and the second region and in which clamping members are disposed so as to be opposite to each other.

For example, a plurality of first regions may be provided.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
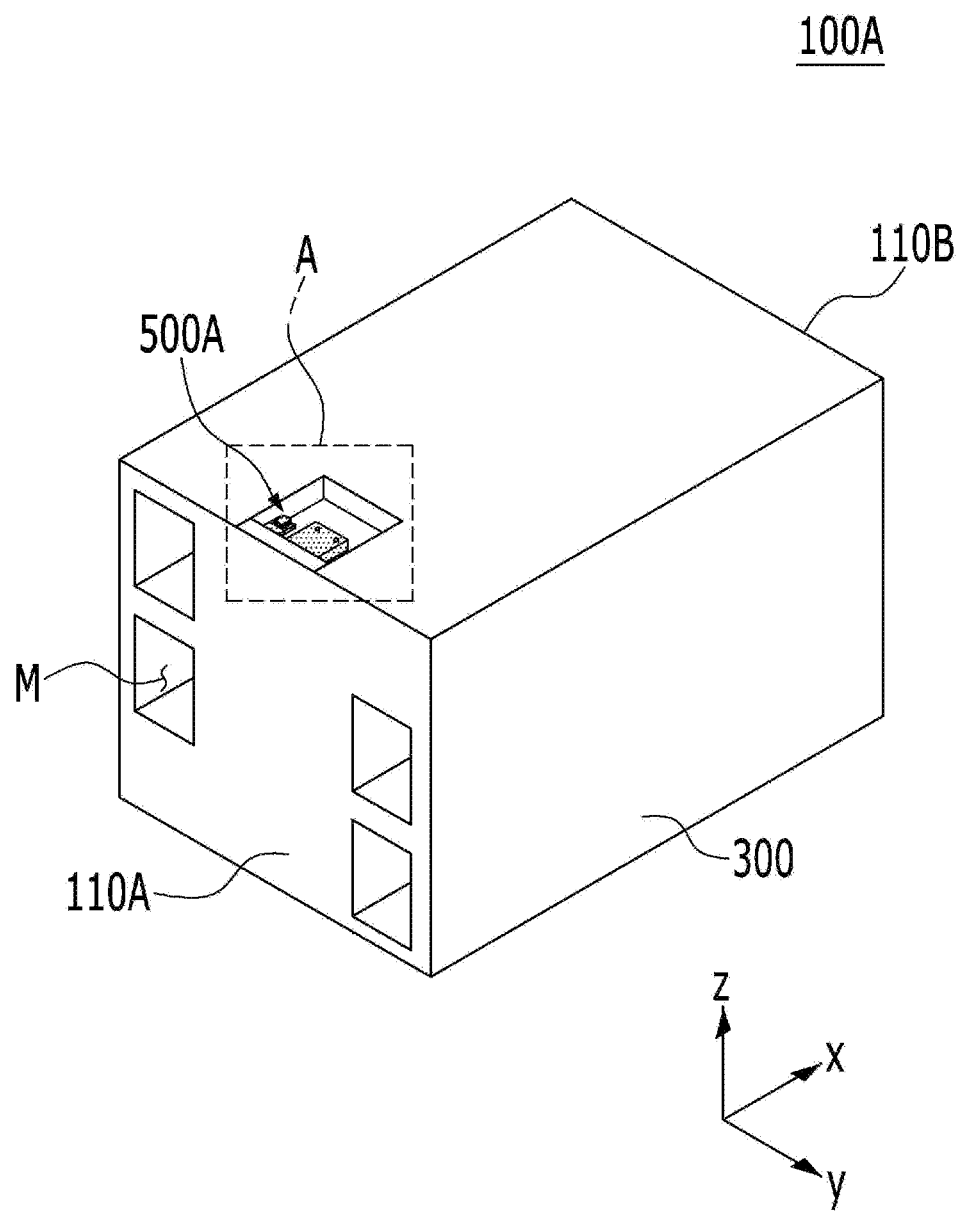
FIG. 1 is a perspective view showing the external appearance of a fuel cell according to one exemplary embodiment of the present disclosure.

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell 100A to 100I according to embodiments will be described with reference to the accompanying drawings. The fuel cell 100A to 100I will be described using the Cartesian coordinate system (x, y, z) for convenience of description. However, other different coordinate systems may be used. In the drawings, an x-axis, a y-axis, and a z-axis of the Cartesian coordinate system are perpendicular to each other. However, the embodiment is not limited thereto. That is, the x-axis, the y-axis, and the z-axis may intersect each other. In the following description, the x-axis direction may be referred to as a "first direction", the y-axis direction may be referred to as a "second direction", and the z-axis direction may be referred to as a "third direction".

Figure 2:
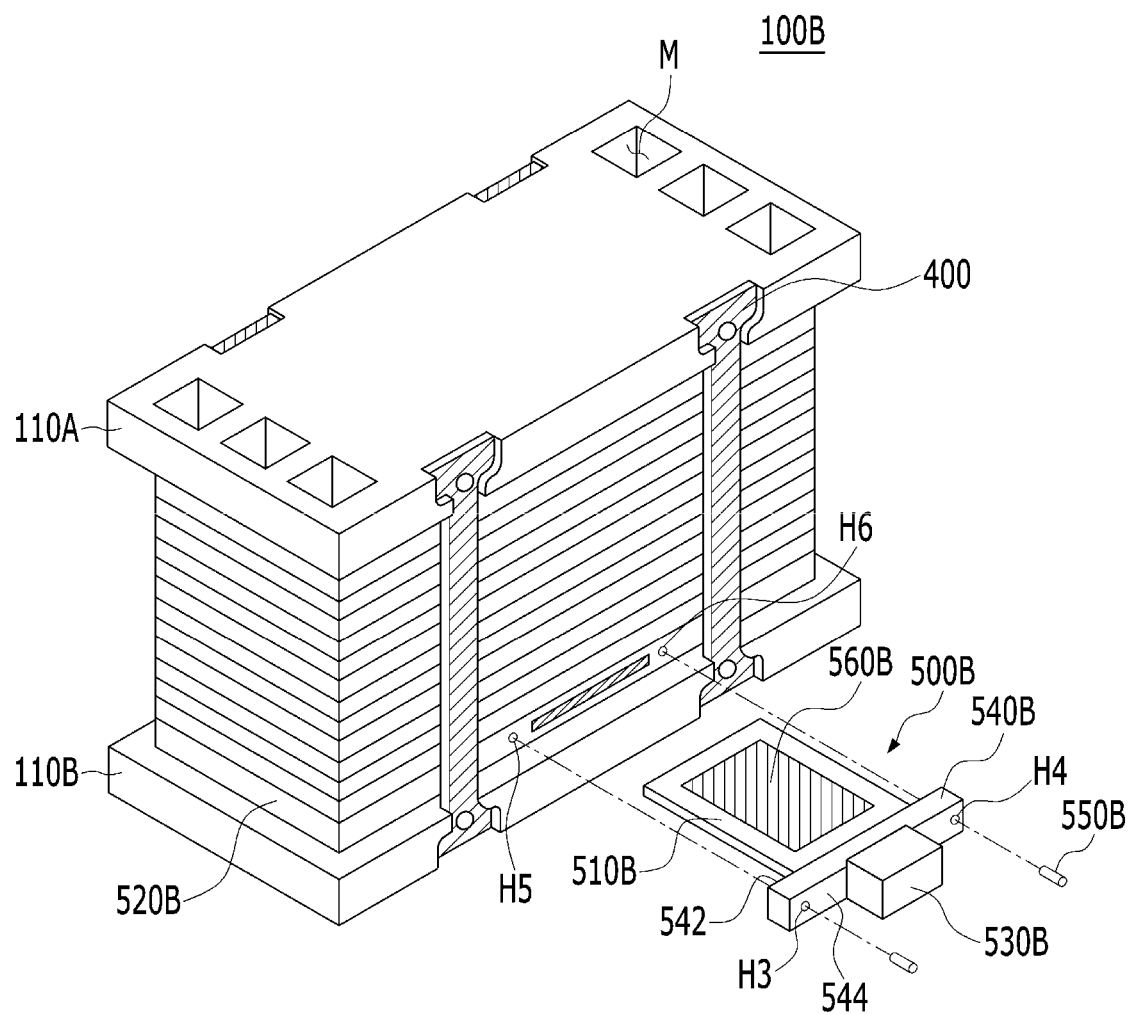
FIG. 2 is a perspective view showing the external appearance of a fuel cell according to another exemplary embodiment of the present disclosure.

FIG. 1 is a perspective view showing the external appearance of a fuel cell 100A according to one exemplary embodiment, and FIG. 2 is a perspective view showing the external appearance of a fuel cell 100B according to another exemplary embodiment of the present disclosure.

Each of the fuel cells 100A and 100B shown in FIGS. 1 and 2 may include a cell stack (not shown) and end plates (pressing plates or compression plates) 110A and 110B.

The fuel cell 100A shown in FIG. 1 may further include an enclosure 300, and the fuel cell 100B shown in FIG. may further include clamping members 400 instead of an enclosure.

The enclosure 300 shown in FIG. 1 may be disposed so as to surround at least a portion of the lateral sides of the cell stack disposed between the end plates 110A and 110B. For example, the enclosure 300 may surround all of the lateral sides of the cell stack. Alternatively, the enclosure 300 may surround a portion of the lateral sides of the cell stack, and an additional member may surround the remaining portion of the lateral sides of the cell stack. The enclosure 300 may serve to clamp a plurality of unit cells together with the end plates 110A and 110B in the first direction. That is, the clamping pressure of the cell stack may be maintained by the end plates 110A and 110B and the enclosure 300, which have rigid structures.

Figure 10:
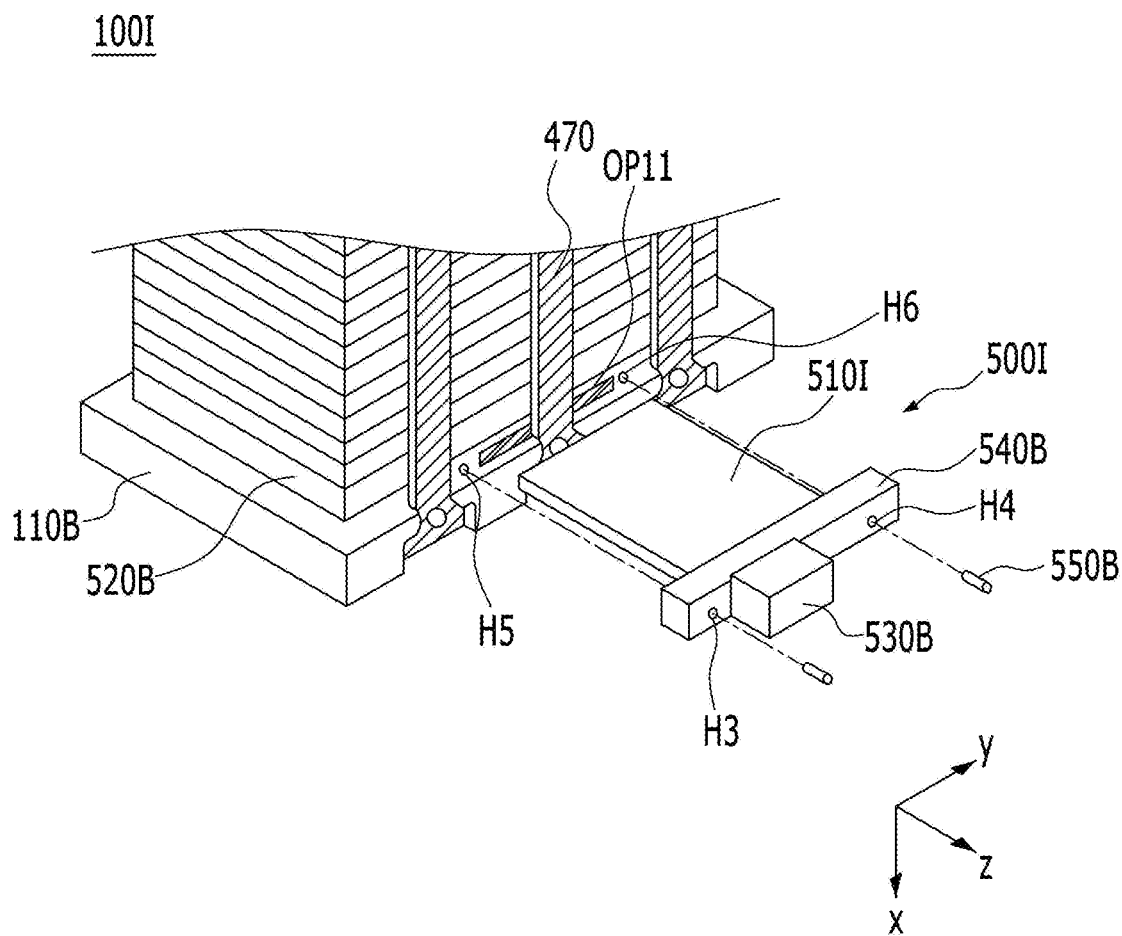
FIG. 10 is a perspective view of a fuel cell according to still another exemplary embodiment of the present disclosure.

The clamping members 400 serve to clamp a plurality of unit cells together with the end plates 110A and 110B in the first direction. For example, as shown in FIG. 2, the clamping members 400 may be formed in a bar shape, but the embodiment is not limited thereto. According to another embodiment, the clamping members 400 may be formed in a long bolt shape, a belt shape, or a rigid rope shape to clamp the unit cells. Although it is illustrated in FIG. 2 that four clamping members 400 are provided, the embodiment is not limited as to the specific number of clamping members 400. That is, the number of clamping members 400 may be more or less than four. For example, as shown in FIGS. 8C, 8D and 10, the number of clamping members 400 may be six.

Figure 3:
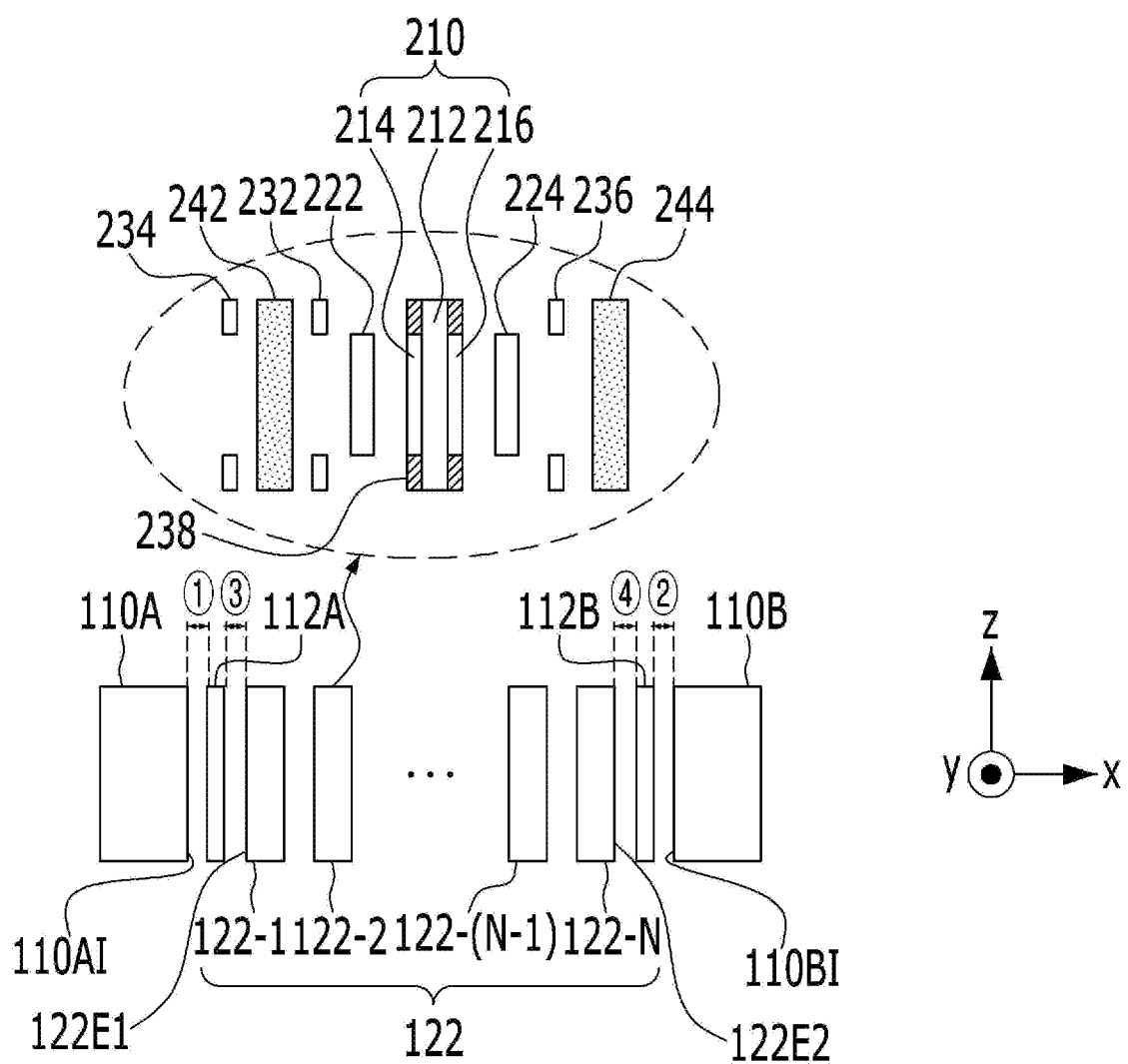
FIG. 3 is a cross-sectional view of end plates and a cell stack of each of the fuel cells shown in FIGS. 1 and 2.

FIG. 3 is a cross-sectional view of the end plates 110A and 110B and the cell stack 122 of each of the fuel cells 100A and 100B shown in FIGS. 1 and 2. For convenience of description, an illustration of the enclosure 300 shown in FIG. 1 and the clamping members 400 shown in FIG. 2 is omitted from FIG. 3. The same components are denoted by the same reference numerals, and a duplicate explanation thereof is omitted.

Each of the fuel cells 100A and 100B may be, for example, a polymer electrolyte membrane fuel cell (or a proton exchange membrane fuel cell) (PEMFC), which has been studied most extensively as a power source for driving vehicles. However, the embodiment is not limited to any specific form of the fuel cells 100A and 100B.

Each of the fuel cells 100A and 100B may include end plates 110A and 110B, current collectors 112A and 112B, and a cell stack 122.

The cell stack 122 may include a plurality of unit cells 122-1 to 122-N, which are stacked in the first direction. Here, "N" is a positive integer of 1 or greater, and may range from several tens to several hundreds. "N" may range, for example, from 100 to 300, but the embodiment is not limited to any specific value of "N".

Each unit cell 122-$n$ (where $1 \leq n \leq N$) may generate 0.6 volts to 1.0 volts of electricity, on average 0.7 volts of electricity. Thus, "N" may be determined in accordance with the intensity of the power to be supplied from the fuel cell 100A or 100B to a load. Here, "load" may refer to a part of a vehicle that requires power when the fuel cell 100A or 100B is used in a vehicle.

Each unit cell 122-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 has a structure in which catalyst electrode layers, in which an electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell 100A or 100B, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell 100A or 100B may generate power due to the electrochemical reaction between hydrogen, which is fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water ("condensate water" or "product water").

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reaction gases, and to transfer the generated electrical energy. To this end, the gas diffusion layers 222 and 224 may be disposed on respective sides of the membrane electrode assembly 210.

That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive.

Each of the first and second gas diffusion layers 222 and 224 may be a microporous layer in which fine carbon fibers are combined. However, the embodiment is not limited to any specific configuration of the first and second gas diffusion layers 222 and 224.

The gaskets 232, 234 and 236 may serve to maintain the airtightness and clamping pressure of the cell stack at an appropriate level with respect to the reactant gases and the coolant, to disperse the stress when the separators 242 and 244 are stacked, and to independently seal the flow paths. As such, since airtightness and water tightness are maintained by the gaskets 232, 234 and 236, the flatness of the surfaces that are adjacent to the cell stack 122, which generates power, may be managed, and thus surface pressure may be distributed uniformly over the reaction surface of the cell stack 122.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to the current collectors 112A and 112B.

The separators 242 and 244 may be disposed outside the gas diffusion layers 222 and 224, respectively. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which a cooling medium (e.g. coolant) may flow. Further, the separators 242 and 244 may be formed of a graphite-based material, a composite graphite-based material, or a metal-based material. However, the embodiment is not limited to any specific material of the separators 242 and 244.

The end plates 110A and 110B shown in FIGS. 1 and 2 may be respectively disposed on the two ends 122E1 and 122E2 of the cell stack 122, and may support and fix the unit cells 122-1 to 122-N. That is, the first end plate 110A may be disposed on one end 122E1 of the two ends 122E1 and 122E2 of the cell stack 122, and the second end plate 110B may be disposed on an opposite end 122E2 of the two ends 122E1 and 122E2 of the cell stack 122.

Each of the end plates 110A and 110B may be configured such that a metal insert is surrounded by a plastic injection-molded product. The metal insert of each of the end plates 110A and 110B may have high rigidity to withstand internal surface pressure, and may be formed by machining a metal material. For example, each of the end plates 110A and 110B may be formed by combining a plurality of plates. However, the embodiment is not limited to any specific configuration of the end plates 110A and 110B.

The current collectors 112A and 112B may be disposed between the two ends 122E1 and 122E2 of the cell stack 122 and the inner surfaces 110AI and 110BI of the end plates 110A and 110B that are arranged on opposite sides of the cell stack 122, respectively. The current collectors 112A and 112B serve to collect the electrical energy generated by the flow of electrons in the cell stack 122 and to supply the electrical energy to a load that uses the fuel cell 100A or 100B.

Further, the first end plate 110A may include a plurality of manifolds (or communicating portions) M. Each of the first and second separators 242 and 244 shown in FIG. 3 may include manifolds that are formed in the same shape at the same positions as the manifolds M of the first end plate 110A shown in FIGS. 1 and 2. Here, the manifolds M may include an inlet manifold and an outlet manifold. Hydrogen and oxygen, which are reactant gases necessary in the membrane electrode assembly 210, may be introduced from the outside into the cell stack 122 through the inlet manifold M. Gas or liquid, in which the reactant gases humidified and supplied to the cell and the condensate water generated in the cell are combined, may be discharged to the outside of the fuel cell 100A or 100B through the outlet manifold M. The cooling medium may flow from the outside into the cell stack 122 through the inlet manifold M and may flow from the cell stack 122 to the outside through the outlet manifold M. As described above, the manifolds M allow the fluid to flow into and out of the membrane electrode assembly 210.

In addition, the fuel cell 100A or 100B according to an exemplary embodiment of the present disclosure may further include a heating unit 500A or 500B.

Figure 4A:
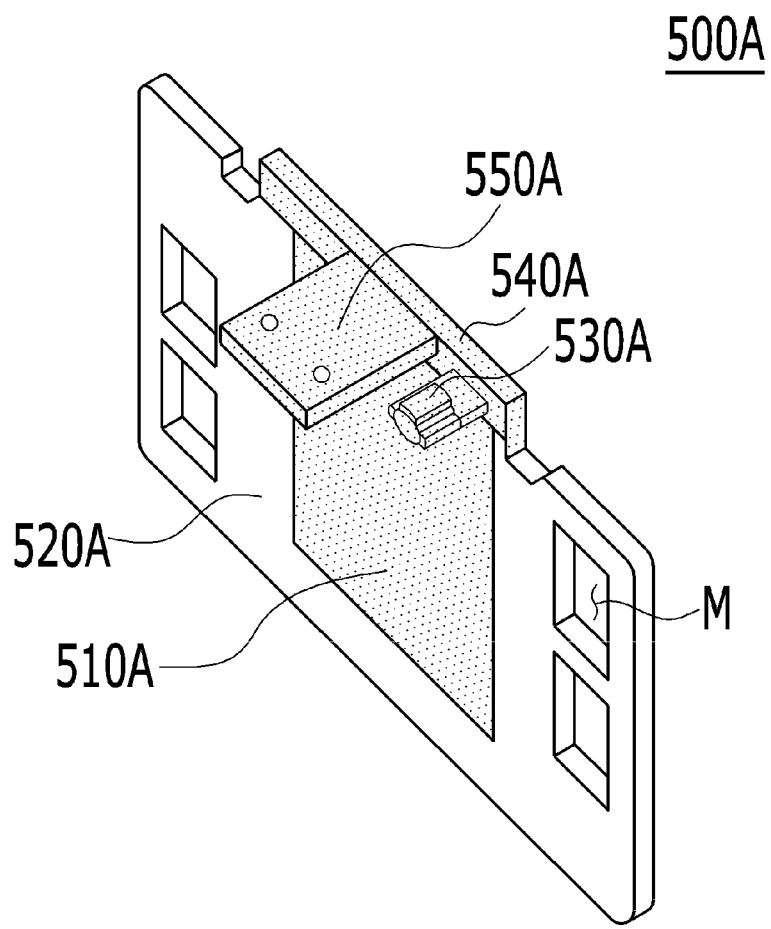
FIGS. 4A, 4B, and 4C are perspective views of an example of a heating unit included in the fuel cell shown in FIG. 1.
Figure 4B:
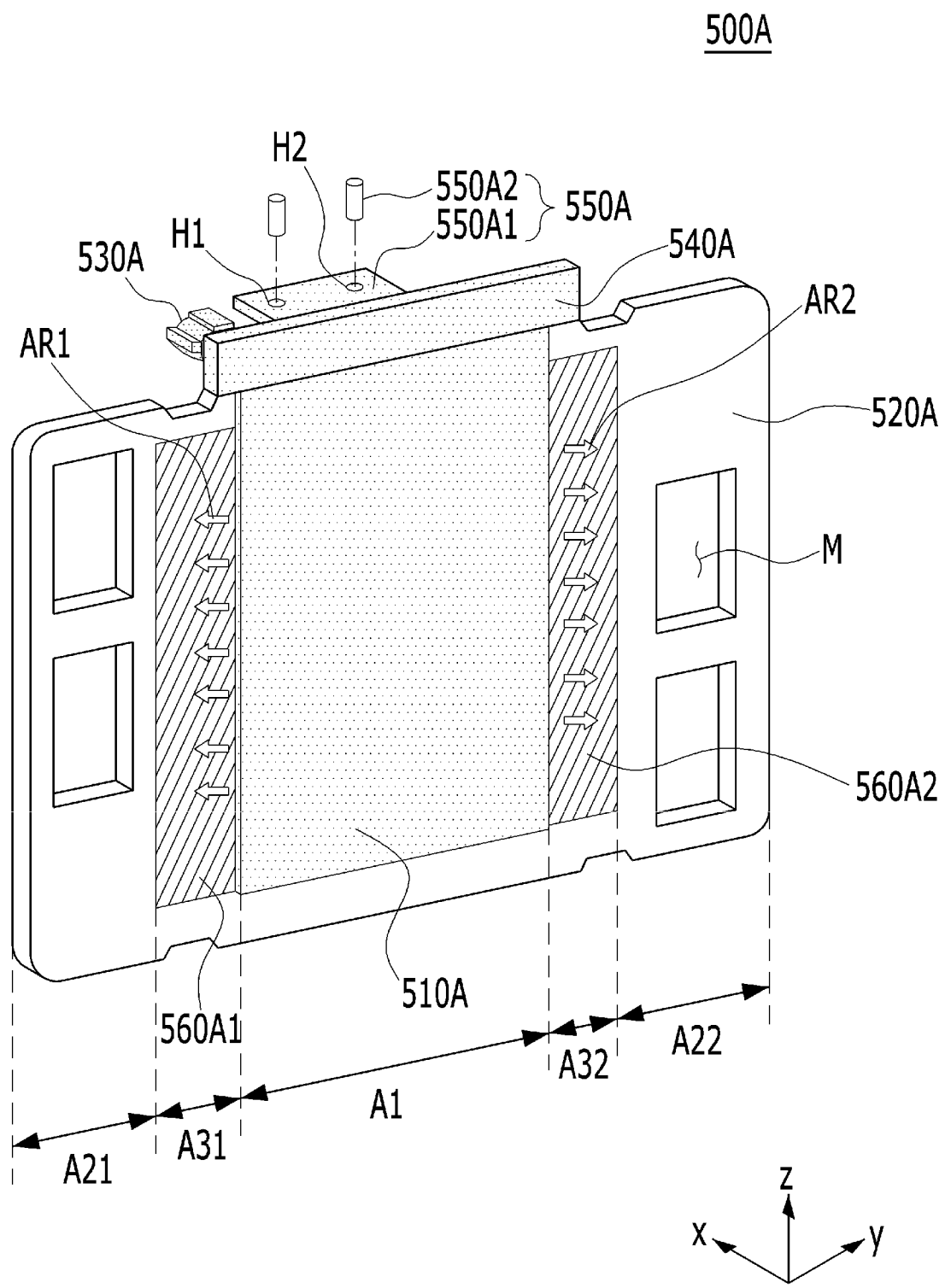
Figure 4C:
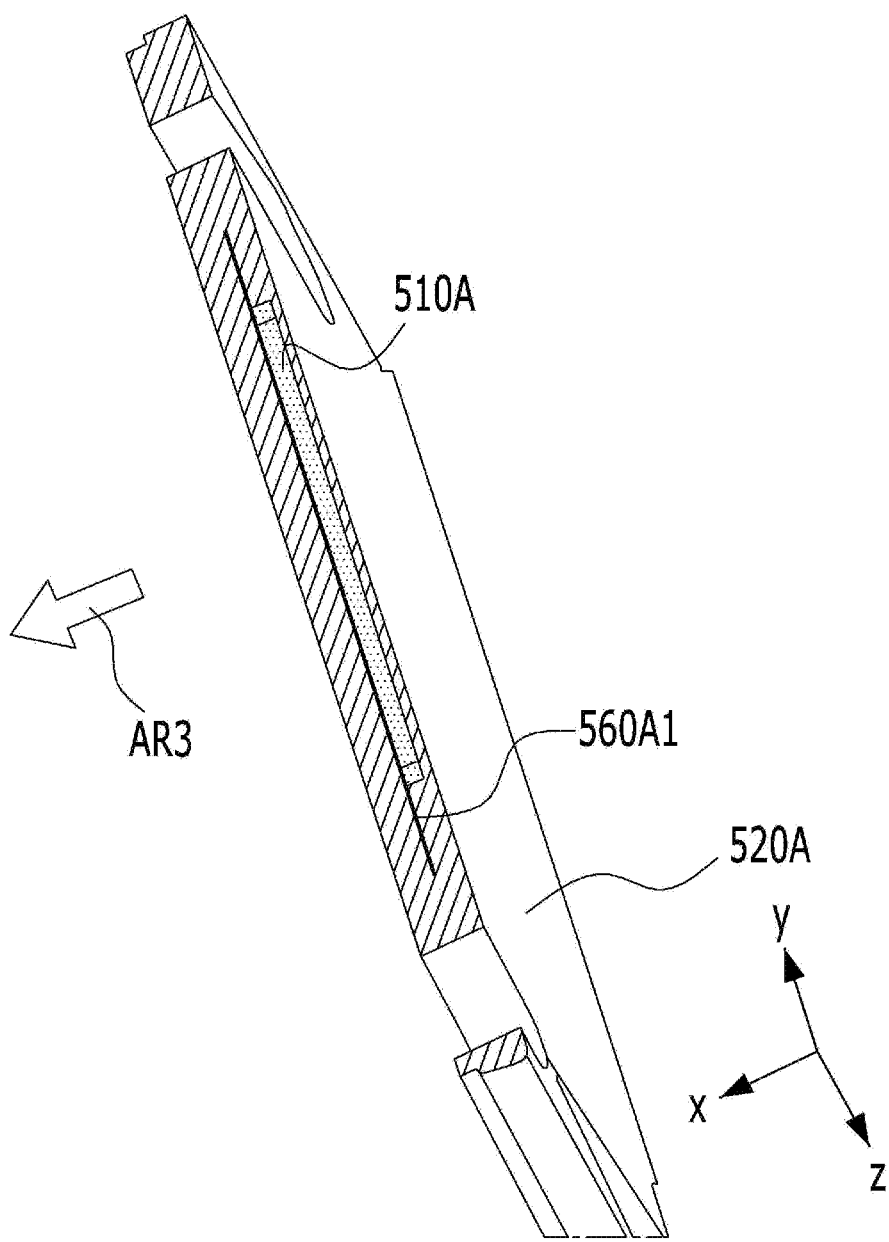

FIGS. 4A to 4C are perspective views of an example of the heating unit 500A included in the fuel cell 100A shown in FIG. 1.

Figure 5:
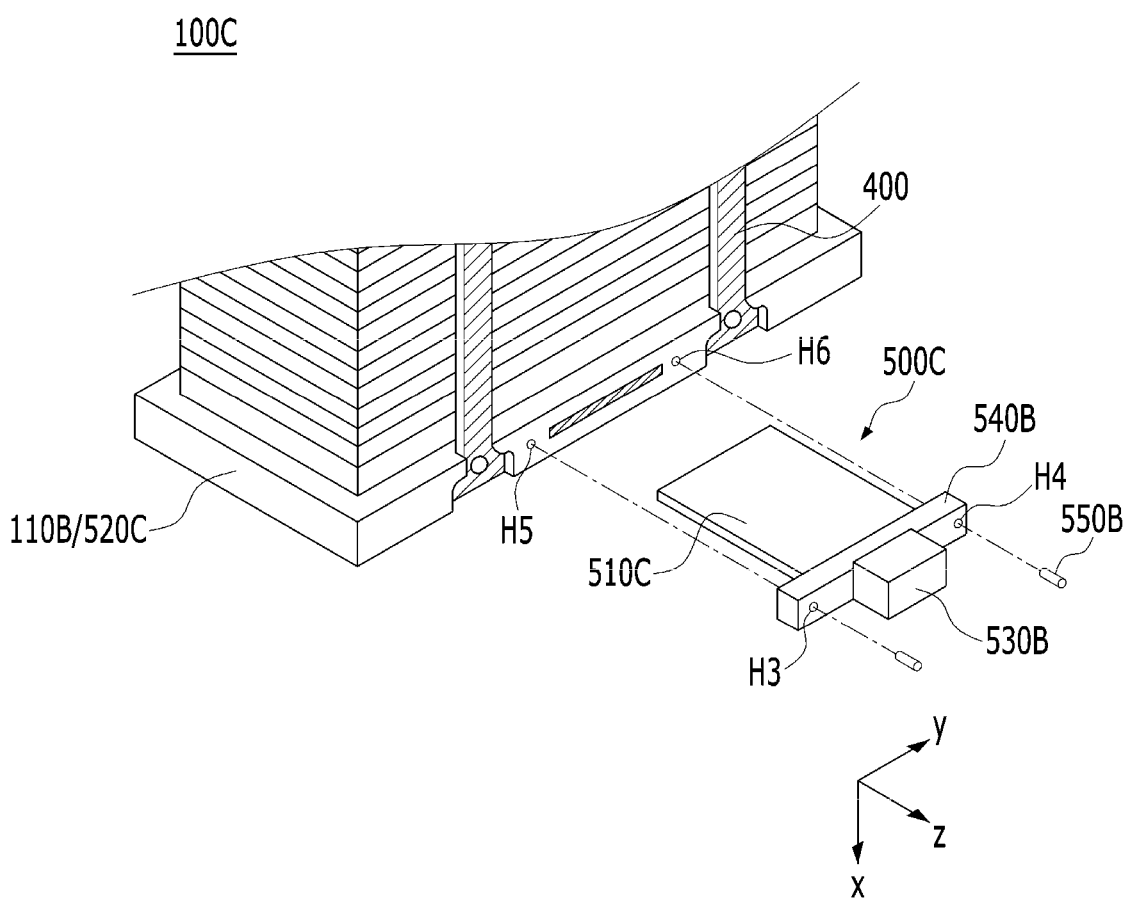
FIG. 5 is a perspective view showing a part of the external appearance of a fuel cell according to still another exemplary embodiment of the present disclosure.

FIG. 5 is a perspective view showing a part of the external appearance of a fuel cell 100C according to still another exemplary embodiment of the present disclosure. The fuel cell 100C shown in FIG. 5 is the same as the fuel cell 100B shown in FIG. 2, except that a heat-generating-part support part 520C is disposed at a position different from the position at which the heat-generating-part support part 520B shown in FIG. 2 is disposed. Thus, in FIG. 5, the same components as those shown in FIG. 2 are denoted by the same reference numerals.

The heating units 500A, 500B, and 500C may serve to heat the cell stack 122, and may be respectively disposed at the two end sides of the cell stack 122. The heating units 500A, 500B, and 500C may include heat-generating parts 510A, 510B, and 510C and heat-generating-part support parts 520A, 520B, and 520C.

The heat-generating-part support parts 520A, 520B, and 520C may be respectively disposed at the two ends 122E1 and 122E2 of the cell stack 122. The heat-generating-part support parts 520A, 520B, and 520C may have a structure that allows the heat-generating parts 510A, 510B, and 510C to be fitted thereinto or to be drawn out therefrom. Here, the heat-generating parts 510A, 510B, and 510C fitted into the heat-generating-part support parts 520A, 520B, and 520C may be mounted in the heat-generating-part support parts 520A, 520B, and 520C so as to be on opposite ends 122E1 and 122E2 of the cell stack 122. According to an exemplary embodiment of the present disclosure, the heat-generating parts 510A, 510B, and 510C may be freely fitted into and drawn out of the heat-generating-part support parts 520A, 520B, and 520C, whereas the heat-generating-part support parts 520A, 520B, and 520C are disposed at fixed positions.

The heat-generating-part support parts 520A and 520B may be respectively disposed in the space between one end 122E1 of the two ends 122E1 and 122E2 of the cell stack 122 and the first end plate 110A and the space between the opposite end 122E2 of the two ends 122E1 and 122E2 of the cell stack 122 and the second end plate 110B. For example, as shown in FIG. 2, the heat-generating-part support part 520B may be disposed in the space between one of the two ends of the cell stack 122 and the second end plate 110B.

A more detailed description will be made below with reference to FIG. 3.

According to one exemplary embodiment of the present disclosure, the heat-generating-part support parts 520A and 520B may be respectively disposed in the space ① between the first end plate 110A and the first current collector 112A and the space ② between the second end plate 110B and the second current collector 112B.

According to another exemplary embodiment of the present disclosure, the heat-generating-part support parts 520A and 520B may be respectively disposed in the space ③ between one end 122E1 of the two ends 122E1 and 122E2 of the cell stack 122 and the first current collector 112A and the space ④ between the opposite end 122E2 of the two ends 122E1 and 122E2 of the cell stack 122 and the second current collector 112B.

According to still another exemplary embodiment of the present disclosure, the heat-generating-part support parts may be integrally formed with the end plates 110A and 110B. That is, the heating units may serve as the end plates 110A and 110B and may also serve to heat the cell stack 122. For example, as shown in FIG. 5, the heat-generating-part support part 520C may serve as the second end plate 110B and may also serve to heat the cell stack 122. The heat-generating-part support part 520C shown in FIG. 5 may be disposed at the position of the second end plate 110B shown in FIG. 2.

According to still another exemplary embodiment of the present disclosure, although not shown in the drawings, the heat-generating-part support parts may be integrally formed with the current collectors 112A and 112B. That is, the heat-generating-part support parts may serve as the current collectors 112A and 112B and may also serve to heat the cell stack 122.

In addition, the heating units 500A, 500B, and 500C may further include power connection parts 530A and 530B and cover parts 540A and 540B.

The power connection parts 530A and 530B are connected to a driving power source, and serve to supply driving power to the heat-generating parts 510A, 510B, and 510C. That is, the heat-generating parts 510A, 510B, and 510C may generate heat in response to the driving power.

The heat-generating parts 510A, 510B, and 510C may include planar heating elements, which are disposed on the opposite ends 122E1 and 122E2 of the cell stack 122 and which are connected to the power connection parts 530A and 530B to generate heat in response to the driving power.

Figure 6A:
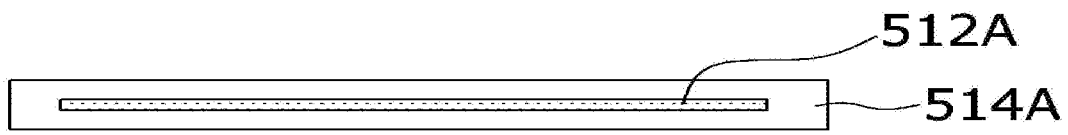
FIGS. 6A, 6B, and 6C are cross-sectional views showing various examples of a planar heating element according to an exemplary embodiment of the present disclosure.
Figure 6B:
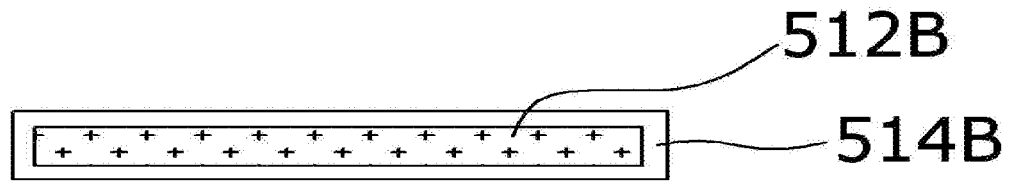
Figure 6C:
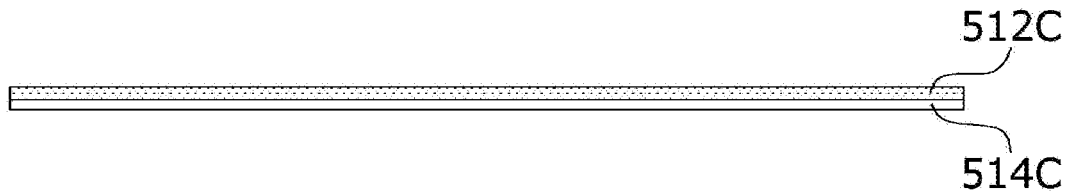

FIGS. 6A, 6B, and 6C are cross-sectional views showing various examples of the planar heating element according to exemplary embodiments of the present disclosure.

The planar heating element according to an exemplary embodiment of the present disclosure may include a heater 512A (512B or 512C) and a heater support part 514A (514B or 514C) disposed so as to surround at least a portion of the heater 512A (512B or 512C).

As shown in FIG. 6B, the heater 512B may be implemented as a plate-shaped heating element. As shown in FIG. 6C, the heater 512C may be formed in a film shape.

The heater support part 514A (514B or 514C) may include at least one of metal, ceramic, or an insulating material. For example, the heater support part 514A shown in FIG. 6A may be formed of ceramic, the heater support part 514B shown in FIG. 6B may be coated with an insulating material, and the heater support part 514C shown in FIG. 6C may be formed of a metal material.

The power connection parts 530A and 530B may be disposed on the cover parts 540A and 540B. For example, referring to FIG. 2, the cover part 540B may include a first surface 542 and a second surface 544. The first surface 542 may correspond to the surface to which the heat-generating part 510B is connected, and the second surface 544 may be the surface that is opposite the first surface 542. As shown in FIGS. 2 and 5, the power connection part 530B may be disposed on the second surface 544 of the cover part 540B, but the embodiment is not limited thereto.

The heating units 500A, 500B, and 500C according to exemplary embodiments of the present disclosure may further include fixing parts 550A and 550B.

Figure 7:
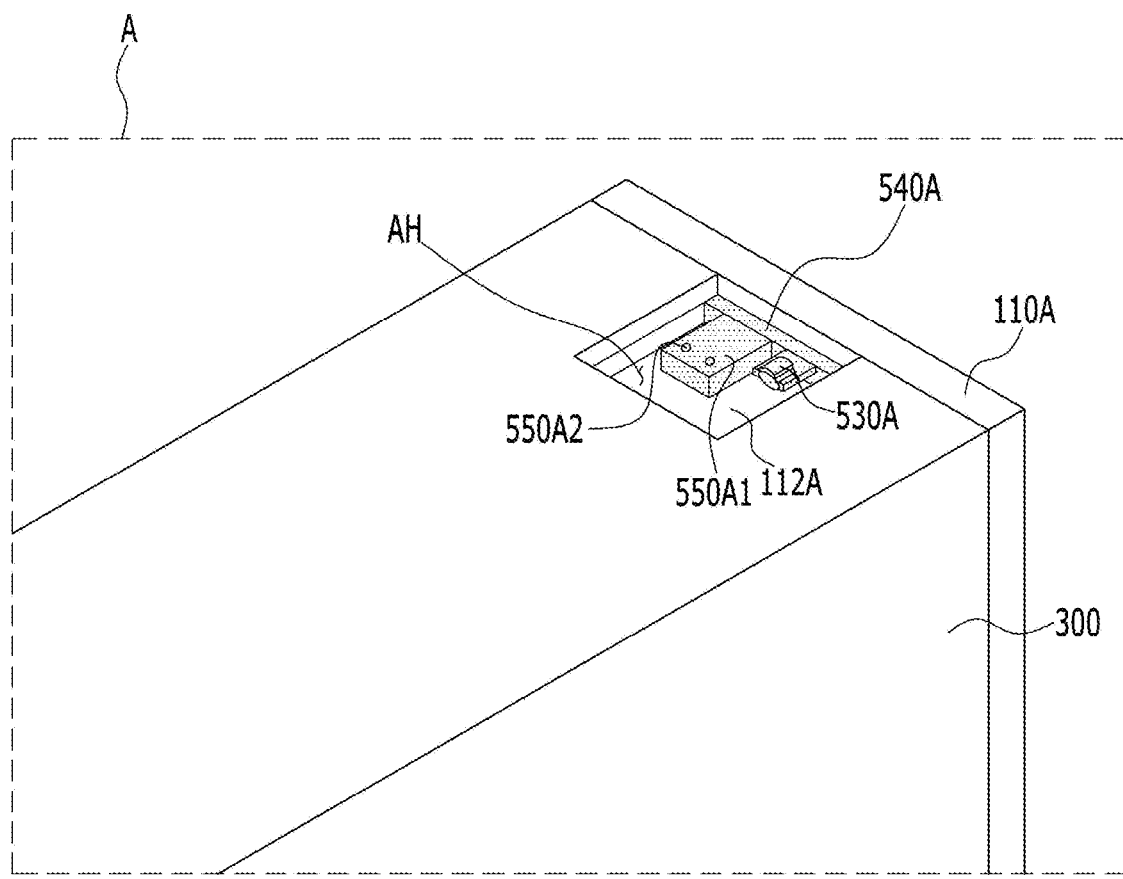
FIG. 7 is an enlarged perspective view of portion 'A' shown in FIG. 1.

FIG. 7 is an enlarged perspective view of portion 'A' shown in FIG. 1. FIG. 7 shows a configuration in which the heating unit 500A is interposed between the first end plate 110A and the cell stack 122.

According to one exemplary embodiment of the present disclosure, the fixing part 550A of the heating unit 500A shown in FIGS. 4A to 4C may detachably secure the cover part 540A to at least one of the end plates 110A and 110B, the current collectors 112A and 112B, or the enclosure 300. To this end, the fixing part 550A may include a fixing plate 550A1 and a first fixing screw 550A2.

The fixing plate 550A1 may include at least one through-hole H1 and H2 extending therein, and may have a shape that protrudes from the cover part 540A. The first fixing screw 550A2 may be fastened through the through-hole H1 and H2 in order to secure the fixing plate 550A1 to at least one of the end plates 110A and 110B, the current collectors 112A and 112B, or the enclosure 300.

According to an exemplary embodiment of the present disclosure, the cover part 540A, the planar heating element 510A, and the power connection part 530A may be integrally movable. Therefore, when the cover part 540A is secured by the fixing part 550A, the planar heating element 510A and the power connection part 530A may also be secured therewith. When the cover part 540A is not secured by the fixing part 550A, the planar heating element 510A and the power connection part 530A may be drawn out of the heat-generating-part support part 520A.

For example, referring to FIG. 7, the fixing plate 550A1 may extend so as to protrude from the cover part 540A in the first direction, and the first fixing screw 550A2 is fastened to the current collector 112A through the through-hole H1 and H2 shown in FIG. 4B, whereby the cover part 540A connected to the fixing plate 550A1 may be, for example, secured to the current collector 112A. Thereafter, when the first fixing screw 550A2 is released from the current collector 112A, the cover part 540A may also be, for example, released from the current collector 112A.

As illustrated in FIG. 7, the enclosure 300 may include a receiving recess AH formed in the periphery of the heat-generating part 510A. The fixing part 550A and the power connection part 530A may extend from the cover part 540A and may be received in the receiving recess AH in the enclosure 300.

According to another exemplary embodiment of the present disclosure, the fixing parts of the heating units 500B and 500C shown in FIGS. 2 and 5 may detachably secure the cover part 540B to the heat-generating-part support parts 520B and 520C. To this end, the fixing part may include a second fixing screw 550B2.

The cover part 540B may include at least one through-hole H3 and H4, and the heat-generating-part support parts 520B and 520C may include at least one blind hole H5 and H6. In this case, the second fixing screw 550B may be fastened to the heat-generating-part support parts 520B and 520C through the through-holes H3 to H6 to secure the cover part 540B to the heat-generating-part support parts 520B and 520C.

According to an exemplary embodiment of the present disclosure, the cover part 540B, the planar heating elements 510B and 510C, and the power connection part 530B may be integrally movable. Therefore, when the cover part 540B is secured to the heat-generating-part support parts 520B and 520C using the second fixing screw 550B, the planar heating elements 510B and 510C and the power connection part 530B may also be secured therewith. When the cover part 540B is released from the heat-generating-part support parts 520B and 520C using the second fixing screw 550B, the planar heating elements 510B and 510C and the power connection part 530B may be drawn out of the heat-generating-part support parts 520B and 520C.

As described above, the planar heating elements 510A, 510B, and 510C may be received in the heat-generating-part support parts 520A, 520B, and 520C and may be secured thereto using the fixing parts 550A and 550B, or may be drawn out of the heat-generating-part support parts 520A, 520B, and 520C using the fixing parts 550A and 550B.

Therefore, when it is desired to replace the heat-generating parts 510A, 510B, and 510C, it is not necessary to remove the enclosure 300 or to disassemble the clamping members 400. That is, the fixed state of the cover parts 540A and 540B owing to the fixing parts 550A and 550B may be released, and subsequently the heat-generating parts 510A, 510B, and 510C may be drawn out of the heat-generating-part support parts 520A, 520B, and 520C.

The heating units 500A, 500B, and 500C may further include heat conduction parts 560A and 560B. Although an illustration of the heat conduction part 560B is omitted from the heating unit 500C shown in FIG. 5, the heat conduction part 560B may be disposed at the heat-generating part 510C, as shown in FIG. 2.

Referring to FIGS. 2 and 4B, the heat conduction parts 560A1, 560A2, and 560B serve to conduct the heat from the heat-generating parts 510A and 510B to the periphery of the heat-generating parts 510A and 510B. Since heat transfer from the heat-generating parts 510A and 510B to the periphery thereof is promoted due to the heat conduction parts 560A1, 560A2, and 560B, the heating efficiency of the heating units 500A and 500B may be improved.

For example, referring to FIG. 4B, since heat transfer from the heat-generating part 510A in the directions indicated by the arrows AR1 and AR2 is promoted, it is possible to supply heat to an area otherwise characterized by poor heat transfer. Referring to FIG. 4C, the direction in which heat is conducted by the heat conduction part 560A1 is indicated by the arrow AR3.

The heat-generating-part support part 520A of the fuel cell 100A according to one exemplary embodiment of the present disclosure, as shown in FIG. 4B, may include a first region A1, second regions A21 and A22, and third regions A31 and A32.

Hereinafter, the first region A1 may be defined as a region that faces the end 122E1 or 122E2 of the cell stack 122 and a region in which the heat-generating part (e.g. 510A) is mounted. The plurality of second regions A21 and A22 may be defined as regions in which the manifolds M are formed and regions that are opposite each other, with the first region A1 interposed therebetween. Each of the plurality of third regions A31 and A32 may be defined as a region that is interposed between the first region A1 and a corresponding one of the plurality of second regions A21 and A22. According to one exemplary embodiment of the present disclosure, the heat conduction parts 560A1 and 560A2 may be disposed in the third regions A31 and A32.

According to another exemplary embodiment of the present disclosure, the heat conduction part 560B, as shown in FIG. 2, may be disposed between the heat-generating part 510B, which is a planar heating element, and the ends 122E1 and 122E2 of the cell stack 122.

Hereinafter, various exemplary embodiments 100D to 100G of the fuel cell 100B, which includes the clamping members 400 instead of the enclosure 300, as shown in FIGS. 2 and 5, will be described with reference to the accompanying drawings.

FIGS. 8A to 8D are plan views of the fuel cells 100D to 100G according to still other exemplary embodiments of the present disclosure.

The heat-generating-part support part 520B shown in FIGS. 8A to 8D may perform the same function as the heat-generating-part support part 520B shown in FIG. 2, and may include a first side 520S1 and a second side 520S2 opposite to the first side 520S1. Some of the clamping bars 410 to 460 may be disposed on the first side 520S1. The remaining ones of the clamping bars 410 to 460 may be disposed on an opposite side to the first side 520S1, i.e., the second side 520S2. Each of the configurations shown in FIGS. 8A and 8B, as shown in FIGS. 2 and 5, includes four clamping bars 400 (410 to 440), whereas each of the configurations shown in FIGS. 8C and 8D includes six clamping bars 400 (410 to 460).

Figure 8A:
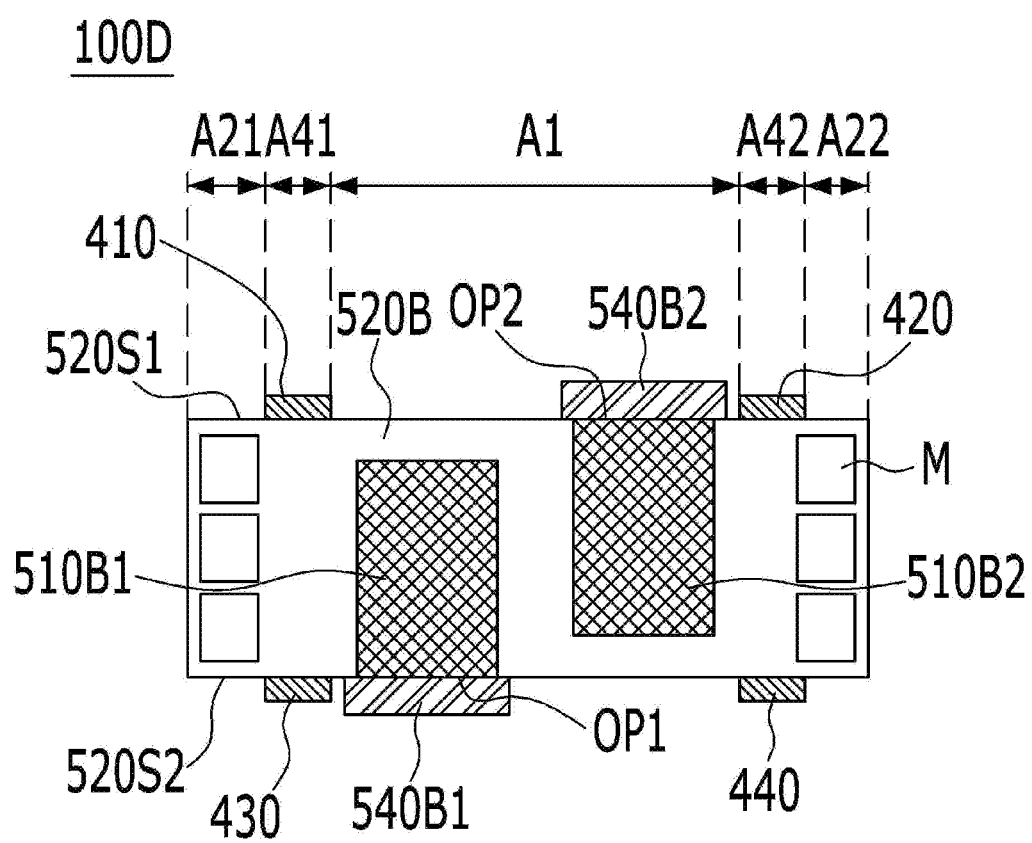
FIGS. 8A, 8B, 8C, and 8D are plan views of fuel cells according to still other exemplary embodiments of the present disclosure.
Figure 8B:
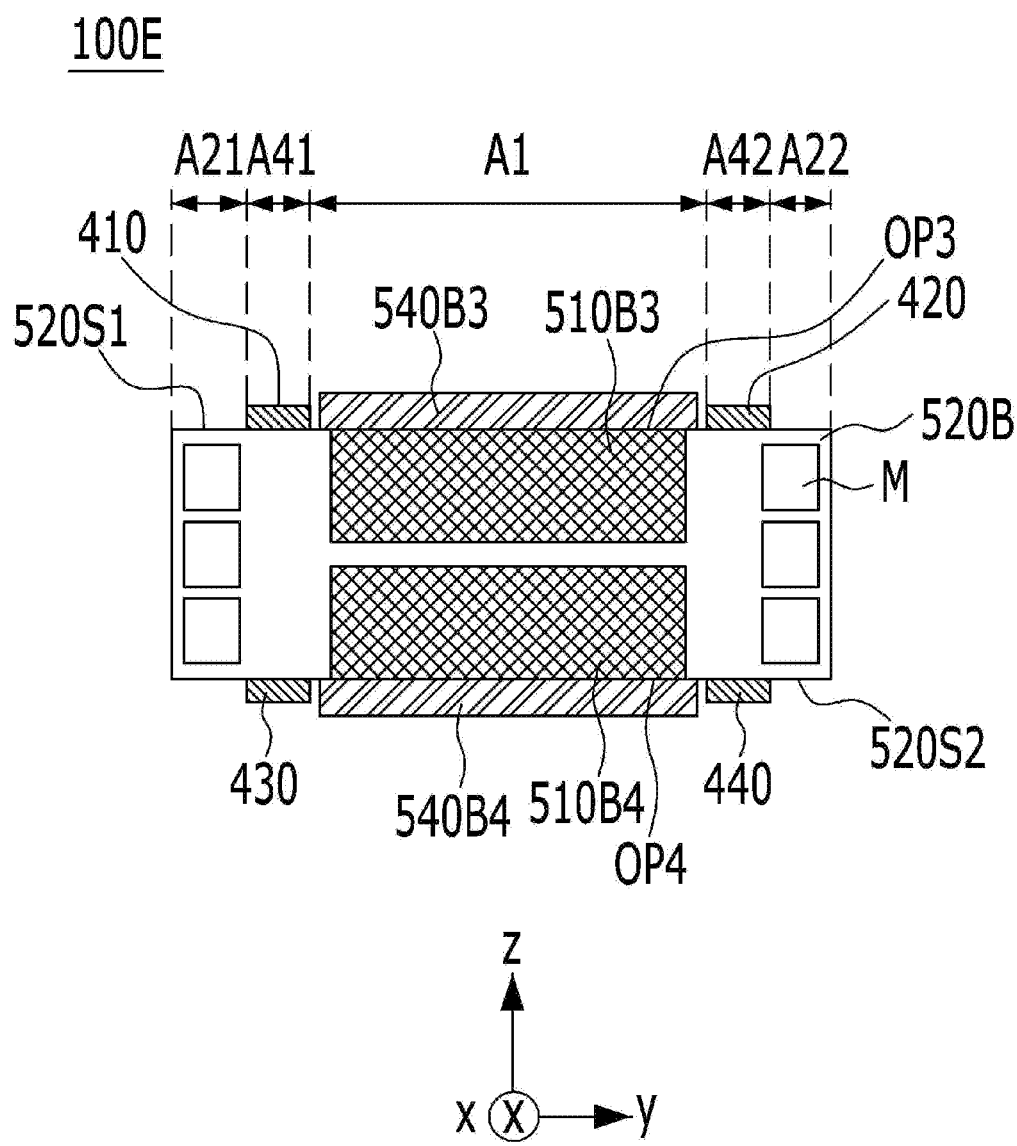
Figure 8C:
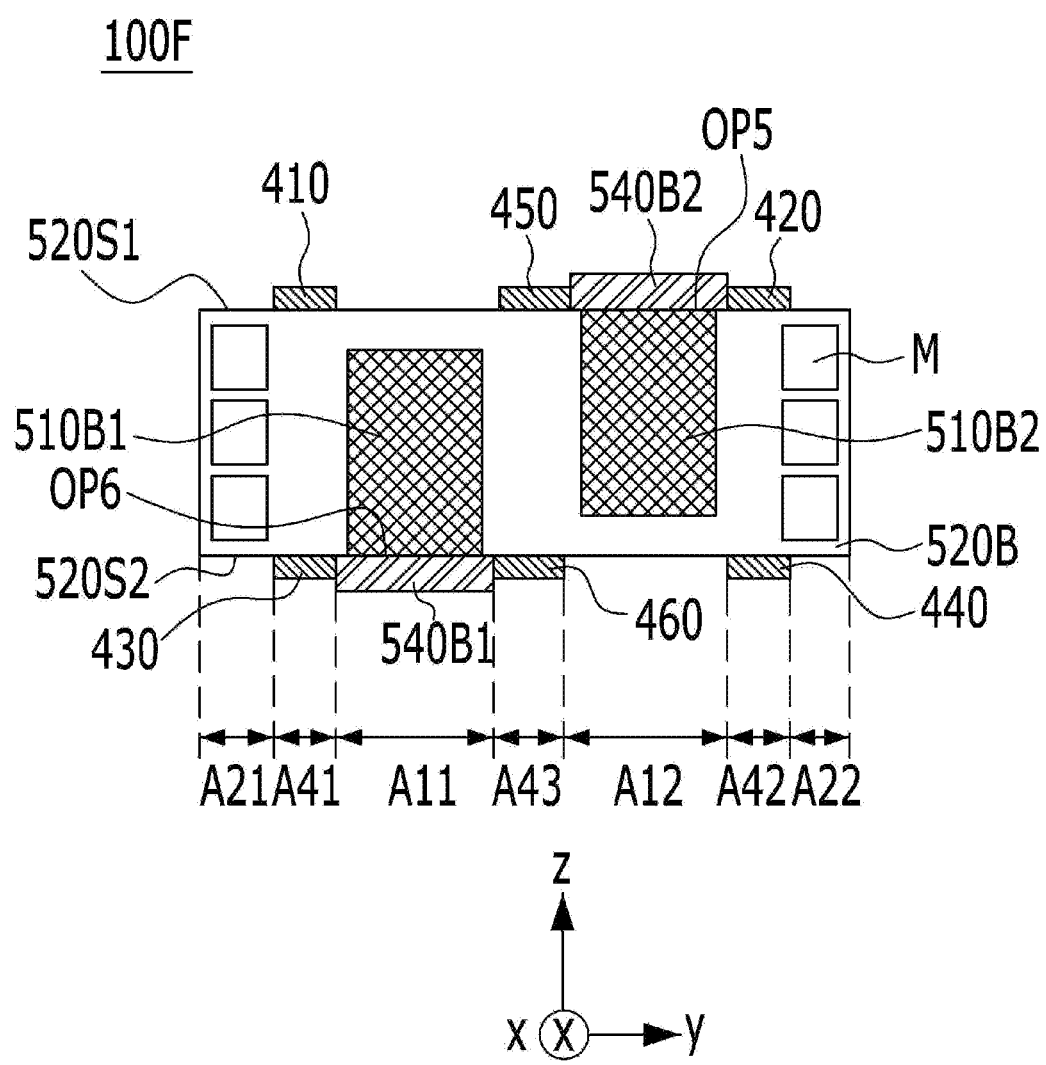
Figure 8D:
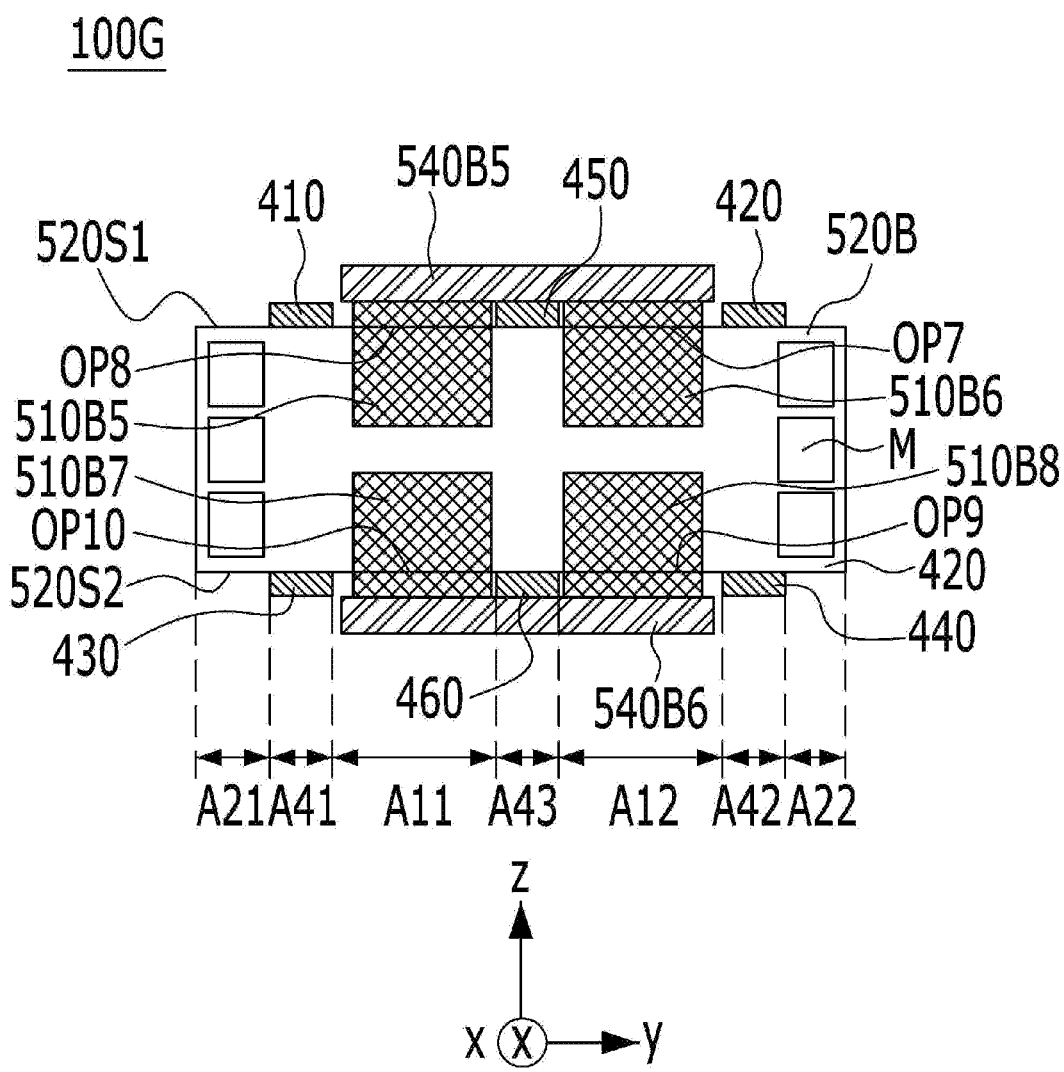

For example, as shown in FIGS. 8A and 8B, the heat-generating-part support part 520B may include a first side 520S1, on which some clamping bars 410 and 420 of the clamping bars 410 to 440 are arranged, and a second side 520S2, on which the remaining ones 430 and 440 of the clamping bars 410 to 440 are arranged. Alternatively, as shown in FIGS. 8C and 8D, the heat-generating-part support part 520B may include a first side 520S1, on which some clamping bars 410, 420 and 450 of the clamping bars 410 to 460 are arranged, and a second side 520S2, on which the remaining ones 430, 440 and 460 of the clamping bars 410 to 460 are arranged.

At least one of the first side 520S1 or the second side 520S2 of the heat-generating-part support part 520B may include at least one opening (or slit) extending therein to allow the heat-generating part to be fitted thereinto or to be drawn out therefrom.

As shown in FIG. 8A, the first side 520S1 of the heat-generating-part support part 520B may include an opening OP2 extending therein to allow the heat-generating part 510B2 to be fitted thereinto or to be drawn out therefrom, and the second side 520S2 of the heat-generating-part support part 520B may include an opening OP1 extending therein to allow the heat-generating part 510B1 to be fitted thereinto or to be drawn out therefrom.

As shown in FIG. 8B, the first side 520S1 of the heat-generating-part support part 520B may include an opening OP3 extending therein to allow the heat-generating part 510B3 to be fitted thereinto or to be drawn out therefrom, and the second side 520S2 of the heat-generating-part support part 520B may include an opening OP4 extending therein to allow the heat-generating part 510B4 to be fitted thereinto or to be drawn out therefrom.

As shown in FIG. 8C, the first side 520S1 of the heat-generating-part support part 520B may include an opening OP5 extending therein to allow the heat-generating part 510B2 to be fitted thereinto or to be drawn out therefrom, and the second side 520S2 of the heat-generating-part support part 520B may include an opening OP6 extending therein to allow the heat-generating part 510B1 to be fitted thereinto or to be drawn out therefrom.

As shown in FIG. 8D, the first side 520S1 of the heat-generating-part support part 520B may include openings OP7 and OP8 extending therein to allow the heat-generating parts 510B5 and 510B6 to be fitted thereinto or to be drawn out therefrom, and the second side 520S2 of the heat-generating-part support part 520B may include openings OP9 and OP10 extending therein to allow the heat-generating parts 510B7 and 510B8 to be fitted thereinto or to be drawn out therefrom.

The heat-generating-part support part 520B may include a first region, a second region, and a fourth region. The above-described definition of the first and second regions may be applied to the fuel cells 100D to 100G shown in FIGS. 8A to 8D. The fourth region may be defined as a region that is interposed between the first region and the second region and a region in which the clamping members are disposed so as to be opposite to each other.

The heat-generating-part support part 520B shown in FIGS. 8A and 8B may include one first region A1, two second regions A21 and A22, and two fourth regions A41 and A42.

The heat-generating-part support part 520B shown in FIGS. 8C and 8D may include two first regions A11 and A12, two second regions A21 and A22, and three fourth regions A41, A42 and A43.

As shown in FIGS. 8A and 8B, a plurality of heat-generating parts 510B1 and 510B2 or a plurality of heat-generating parts 510B3 and 510B4 may be disposed in one first region A1 so as to be spaced apart from each other. Alternatively, as shown in FIG. 8C, the heat-generating part 510B1 may be disposed in one A11 of the two first regions A11 and A12, and the heat-generating part 510B2 may be disposed in the other one A12 of the two first regions A11 and A12. Alternatively, as shown in FIG. 8D, the heat-generating parts 510B5 and 510B7 may be disposed in one A11 of the two first regions A11 and A12, and the heat-generating parts 510B6 and 510B8 may be disposed in the other one A12 of the two first regions A11 and A12.

As shown in FIGS. 8A, 8B, 8C and 8D, it is possible to efficiently heat the cell stack 122 by variously setting the positions and the sizes of the heat-generating parts 510B1 to 510B8.

The heat-generating parts 510A and 510C may be disposed in the heat-generating-part support parts 520A and 520C in the same manner as shown in FIGS. 8A to 8D.

Figure 9A:
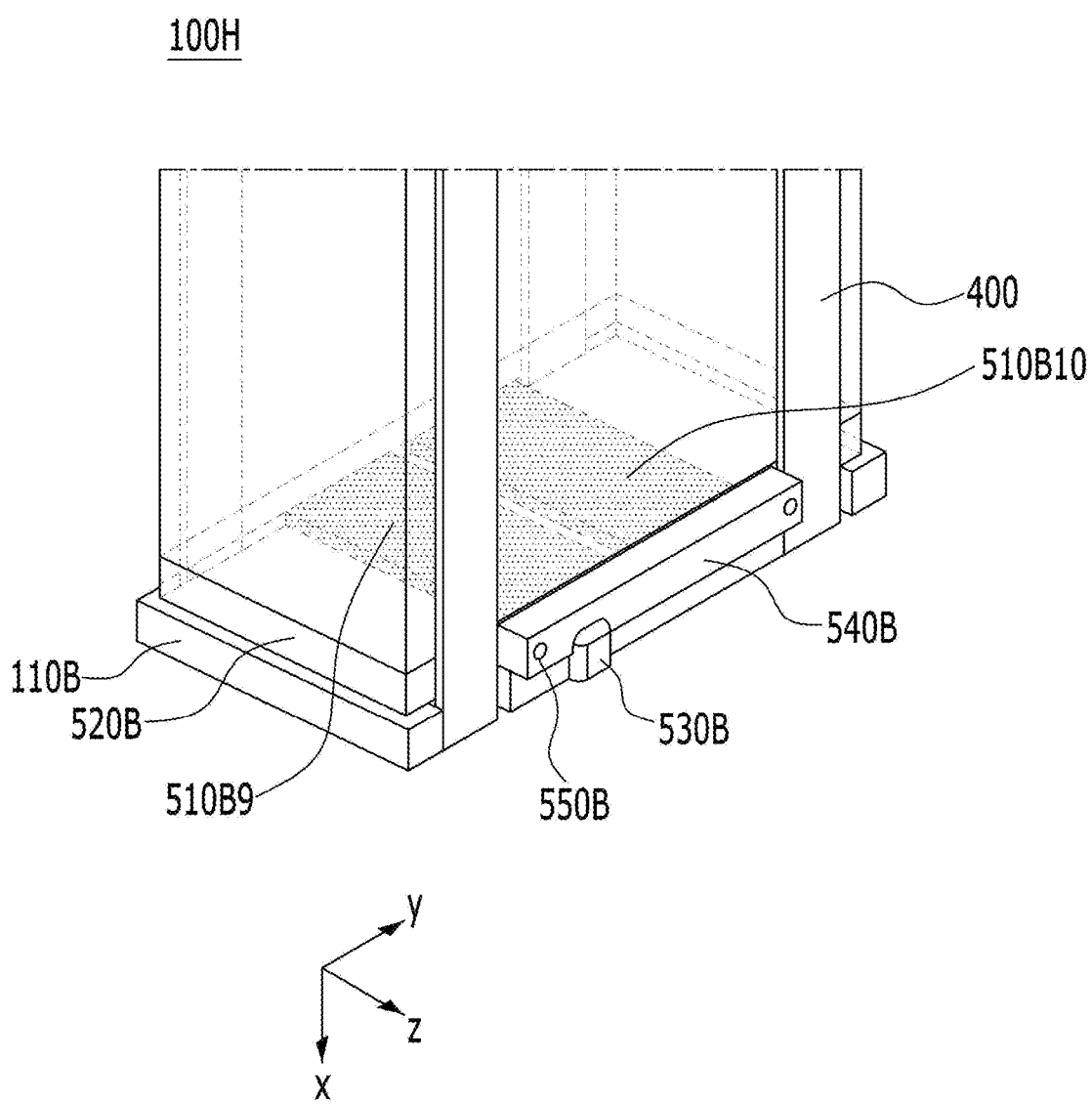
FIGS. 9A and 9B are perspective views of a fuel cell according to still another exemplary embodiment of the present disclosure.
Figure 9B:
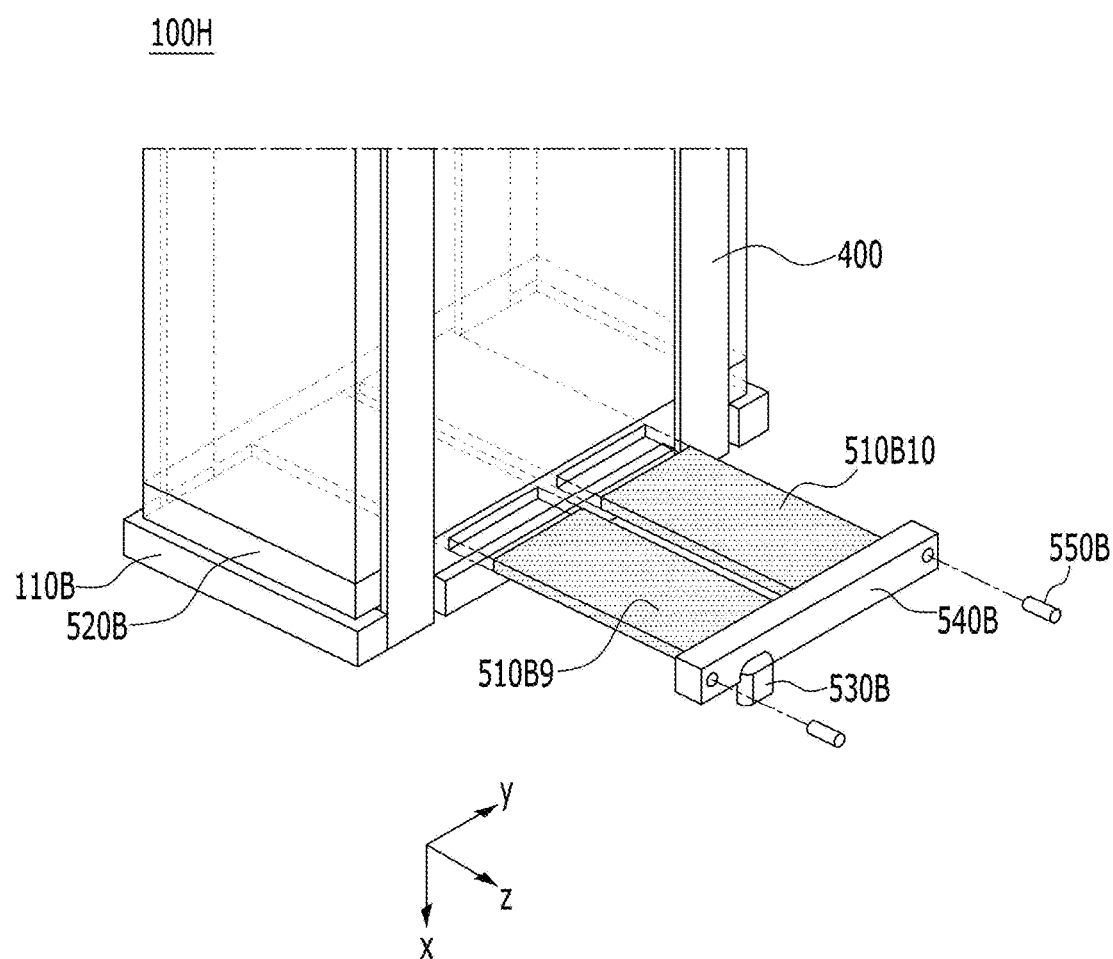

FIGS. 9A and 9B are perspective views of a fuel cell 100H according to still another exemplary embodiment of the present disclosure.

FIG. 9A shows the state in which the heat-generating parts 510B9 and 510B10 are fitted into the heat-generating-part support part 520B, and FIG. 9B shows the state in which the heat-generating parts 510B9 and 510B10 are drawn out of the heat-generating-part support part 520B or the state before the heat-generating parts 510B9 and 510B10 are fitted into the heat-generating-part support part 520B. In FIGS. 9A and 9B, the same components as those of the fuel cell 100B shown in FIG. 2 are denoted by the same reference numerals, and a duplicate explanation thereof is omitted. When the heat-generating-part support part 520B shown in FIGS. 9A and 9B is replaced with the heat-generating-part support part 520C shown in FIG. 5, the following description may also be applied thereto.

According to one exemplary embodiment of the present disclosure, as shown in FIG. 2, one cover part 540B may be connected to one heat-generating part 510B, and only one heat-generating part 510B may be fitted into or drawn out of the heat-generating-part support part 520B. As shown in FIGS. 8A to 8C, since one cover part 540B1 to 540B4 is connected to one heat-generating part 510B1 to 510B4, only one heat-generating part 510B1 to 510B4 may be fitted into or drawn out of the heat-generating-part support part 520B.

According to another exemplary embodiment of the present disclosure, as shown in FIGS. 8D, 9A, and 9B, one cover part 540B may be connected to a plurality of heat-generating parts. That is, as shown in FIG. 8D, one cover part 540B5 may be connected to the plurality of heat-generating parts 510B5 and 510B6, and one cover part 540B6 may be connected to the plurality of heat-generating parts 510B7 and 510B8. As shown in FIGS. 9A and 9B, one cover part 540B may be connected to the plurality of heat-generating parts 510B9 and 510B10.

FIG. 10 is a perspective view of a fuel cell 100I according to still another exemplary embodiment of the present disclosure.

In the fuel cells 100B to 100H shown in FIGS. 2, 5, 8A to 8D, 9A, and 9B, the openings (e.g. OP1 to OP10 shown in FIGS. 8A to 8D), through which the heat-generating parts 510B (510B1 to 510B10) and 510C of the heating units 500B, 500C and 500I are fitted into or drawn out of the heat-generating-part support parts 520B and 520C, do not overlap the clamping members 400. That is, it is not necessary to remove the clamping members 400 (410 to 460) in order to fit or draw the heat-generating parts 510B (510B1 to 510B10) and 510C into or out of the heat-generating-part support parts 520B and 520C.

According to another exemplary embodiment of the present disclosure, in the fuel cell 100I shown in FIG. 10, the opening OP11, through which the heat-generating part 510I of the heating unit 500I is fitted into or drawn out of the heat-generating-part support part 520B, may overlap some (e.g., a clamping member 470) of the clamping members 400. In this case, it is required to remove the clamping member 470, which overlaps the opening OP11, in order to fit or draw the heat-generating part 510I into or out of the heat-generating-part support part 520B. Except for this configuration, the fuel cell 100I shown in FIG. 10 is the same as the fuel cell 100B shown in FIG. 2. Thus, the same components are denoted by the same reference numerals, and a duplicate explanation thereof is omitted.

Hereinafter, a fuel cell according to a comparative example and the fuel cell according to an exemplary embodiment of the present disclosure will be described with reference to the accompanying drawings.

Figure 11:
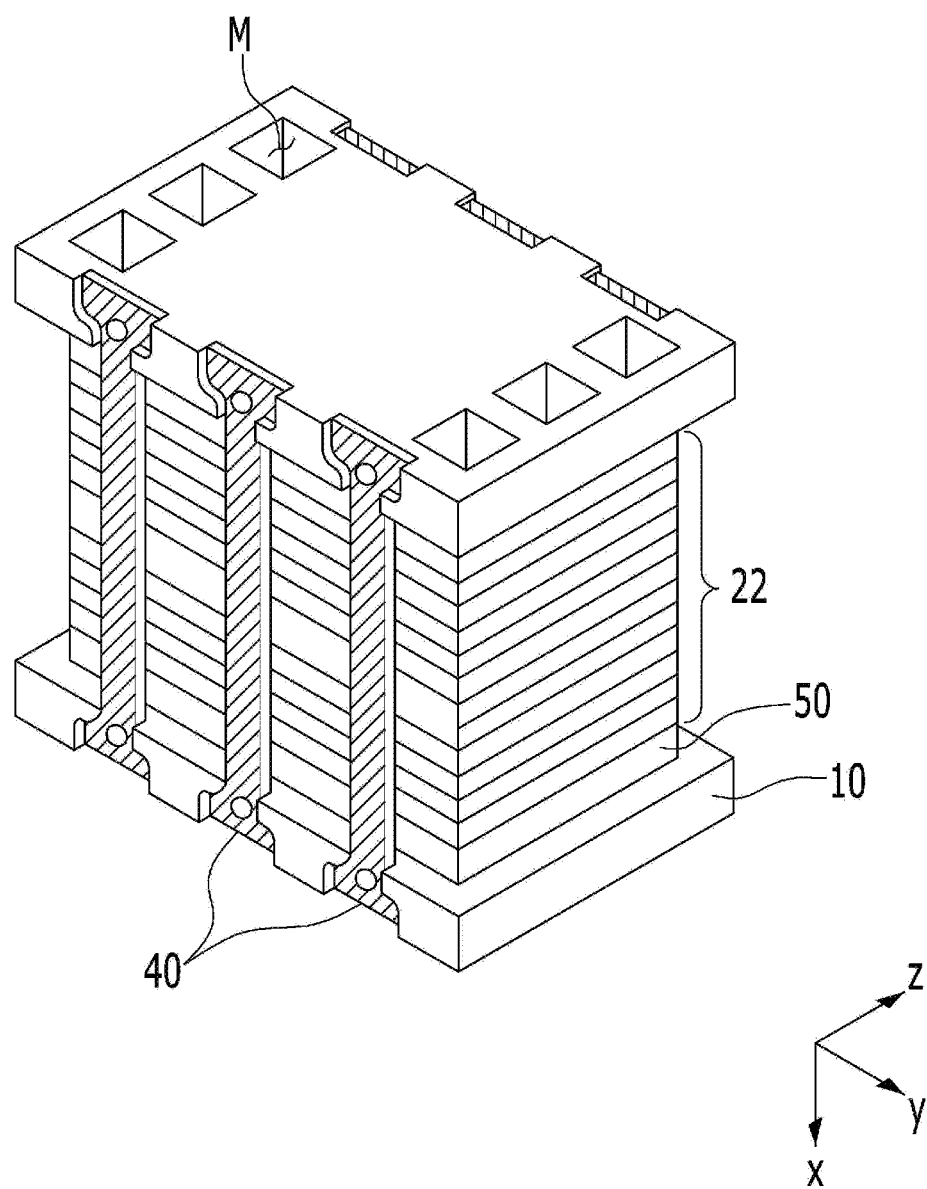
FIG. 11 is a perspective view of a fuel cell according to a comparative example.

FIG. 11 is a perspective view of a fuel cell according to a comparative example.

The fuel cell shown in FIG. 11 includes an end plate 10, a cell stack 22, clamping bars 40, and a heater 50. The end plate 10, the cell stack 22, the clamping bars 40, and the heater 50 perform the same function as the end plate 110B, the cell stack 122, the clamping members 400, and the heating unit 500A to 500C and 500I, respectively.

In the fuel cell according to the comparative example, the heater 50 is inserted between the end plate 10 and the cell stack 22.

In this case, if the heater 50 breaks down, the clamping bars 50 need to be completely removed from the fuel cell in order to disassemble the cell stack 22, and the cell stack 22 needs to be reassembled after the broken heater 50 is replaced, which leads to inconvenience in use and maintenance thereof. Further, in the case of the comparative example, in which the heater 50 is inserted between the end plate 10 and the cell stack 22, even if the heater 50 does not break down, the clamping force of the cell stack 22 may be lowered due to the degradation of the material of the heater 50, thus requiring unscheduled replacement of the heater 50. Furthermore, when all of the clamping members are removed in order to replace the heater 50, the performance of the fuel cell may be changed, and thus various aspects of the performance of the fuel cell, such as airtightness and output performance, need to be rechecked. To this end, expensive performance evaluation equipment such as electronic load equipment may be required, the performance test time may increase due to the process of injecting and discharging coolant, and labor costs required for testing may increase.

On the other hand, in the case of the fuel cell 100A to 100H according to an exemplary embodiment of the present disclosure, when it is desired to replace the heat-generating part 510A, 510B (510B1 to 510B10) and 510C of the heating unit 500A to 500C, only the heat-generating part 510A, 510B (510B1 to 510B10) and 510C is drawn out of the fixed heat-generating-part support part 520A, 520B and 520C and is replaced with a new one, and the new heat-generating part is fitted into the heat-generating-part support part 520A, 520B and 520C. Thus, it is not necessary to remove the enclosure 300 or the clamping members 400 in order to replace the heat-generating part. Alternatively, in the case of the fuel cell 100I according to an exemplary embodiment of the present disclosure, when it is desired to replace the heat-generating part 510I of the heating unit 500I, only some (e.g. 470) of the clamping members 400 are removed instead of removing all of the clamping members 400, only the heat-generating part 510I is drawn out of the heat-generating-part support part 520B and is replaced with a new one, the new heat-generating part is fitted into the heat-generating-part support part 520B, and only the removed clamping member 470 is mounted again. Thus, it is not necessary to check many inspection points, such as airtightness and output performance, unlike the comparative example. As a result, in the case of the fuel cell according to an exemplary embodiment of the present disclosure, it is possible to accomplish the replacement of the heat-generating part 510A, 510B (510B1 to 510B10) and 510C without checking the output performance, thereby reducing investment costs and the time and labor required for maintenance.

That is, as described above, according to an exemplary embodiment of the present disclosure, it is possible to reduce the time, cost and labor required for the replacement of the heat-generating part 510A, 510B (510B1 to 510B10), 510C and 510I compared to the comparative example. Even if the airtightness performance is inspected after disassembling the cell stack 22 and replacing the heater 50, the airtightness performance may be deteriorated. However, according to the fuel cell of the embodiment, since the cell stack 122 is not disassembled, it is possible to fundamentally prevent the above problem.

When a vehicle equipped with a fuel cell in which a plurality of unit cells 122-1 to 122-N is stacked is started at a low temperature (e.g. below zero), the temperature of the fuel cell needs to rise to a temperature suitable for the driving of the vehicle. In this case, the time required for the temperature of the plurality of unit cells 122-1 to 122-N to rise depends on the positions of the cells. In particular, since the cells 122-1 and 122-N positioned at the two ends of the cell stack 122 dissipate a large amount of heat outside, the rate of temperature increase thereof is low, which may increase the total time required to start the vehicle.

Therefore, in the case of the fuel cell 100A to 100I according to an exemplary embodiment of the present disclosure, the heating units 500A, 500B and 500C are disposed on the two ends of the fuel cell, thereby shortening the time required to start a vehicle equipped with the fuel cell and preventing heat loss.

In the case in which the heating units 500A, 500B and 500C are disposed outside the clamping device (e.g. the enclosure 300 or the clamping member 400), the heat conducted to the cells inevitably passes through the clamping device. Thus, the capacity of the heating units may need to be increased in order to compensate for undesirable heat loss.

However, in the case of the fuel cell 100A to 100I according to an exemplary embodiment of the present disclosure, since the heating units 500A, 500B and 500C are disposed close to the cells (e.g. in contact with the cells) inside the clamping device, the rate of temperature increase of the fuel cell may increase, and the capacity of the heating units 500A, 500B and 500C may be reduced.

As is apparent from the above description, according to a fuel cell of the embodiment, when it is desired to replace a heat-generating part of a heating unit, only the heat-generating part is drawn out of a fixed heat-generating-part support part and is replaced with a new one, and the new heat-generating part is fitted into the heat-generating-part support part. Thus, it is not necessary to remove an enclosure or clamping members in order to replace the heat-generating part. Alternatively, only some of the clamping members are removed. As a result, it is possible to greatly reduce the time, expense, and labor required to replace the heat-generating part. Further, through the application of a heat conduction part, it is possible to improve the heating efficiency of the heating unit, to increase the rate of temperature increase, to reduce the capacity of the heating unit, to shorten the time required to start up a vehicle equipped with a fuel cell, and to prevent heat loss.

The above-described various embodiments may be combined with each other without departing from the object of the present disclosure unless being contrary to each other. In addition, for any element, which is not described in detail, of any of the various embodiments, refer to the description of the element having the same reference numeral of another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell, comprising:
a cell stack comprising a plurality of stacked unit cells;
a heating unit configured to apply heat to the cell stack;
an end plate disposed on an end side of the cell stack; and
a current collector arranged between the end side of the cell stack and the end plate,
wherein the heating unit comprises:
a heat-generating part; and
a heat-generating-part support part disposed on the end side of the cell stack,
wherein the heat-generating-part support part allows the heat-generating part to be fitted thereinto or to be drawn out therefrom,
wherein the heating unit further comprises:
a power connection part connected to a driving power source; and
a cover part on which the power connection part is disposed,
wherein the heat-generating part comprises a planar heating element connected to the power connection part,
wherein the planar heating element is configured to generate heat in response to the driving power source, and
wherein the planar heating element is disposed on the end side of the cell stack.

2. The fuel cell according to claim 1, wherein the heat-generating-part support part is arranged between the end side of the cell stack and the end plate.

3. The fuel cell according to claim 2, wherein the heat-generating-part support part is arranged between the end side of the cell stack and the current collector.

4. The fuel cell according to claim 2, wherein the heat-generating-part support part is arranged between the end plate and the current collector.

5. The fuel cell according to claim 1, wherein the heat-generating-part support part is integrally formed with the end plate.

6. The fuel cell according to claim 1, wherein the heat-generating-part support part is integrally formed with the current collector.

7. The fuel cell according to claim 1, further comprising an enclosure surrounding at least a portion of lateral sides of the cell stack.

8. The fuel cell according to claim 7, wherein the heating unit further comprises a fixing part configured to detachably secure the cover part to at least one of the end plate, the current collector, or the enclosure, and
wherein the cover part, the planar heating element, and the power connection part are integrally movable.

9. The fuel cell according to claim 8, wherein the enclosure comprises a receiving recess formed in a periphery of the heat-generating part, and
wherein the fixing part and the power connection part extend from the cover part, and are received in the receiving recess.

10. The fuel cell according to claim 1, wherein the heating unit further comprises a fixing part configured to detachably secure the cover part to the heat-generating-part support part, and
wherein the cover part, the planar heating element, and the power connection part are integrally movable.

11. The fuel cell according to claim 10, wherein the cover part comprises a through-hole extending therein, and
wherein the fixing part comprises a fixing screw that is fastened to the heat-generating-part support part through the through-hole.

12. The fuel cell according to claim 7, wherein the heating unit further comprises a heat conduction part configured to conduct heat from the heat-generating part to a periphery of the heat-generating part.

13. The fuel cell according to claim 12, wherein the heat-generating-part support part comprises:
 a first region in which the heat-generating part is mounted, the first region being disposed on the end side of the cell stack;
 second regions in which manifolds are disposed, the second regions being opposite each other, with the first region interposed therebetween; and
 third regions in which the heat conduction part is disposed, each of the third regions being disposed between the first region and a respective one of the second regions.

14. The fuel cell according to claim 12, wherein the heat conduction part is arranged between the planar heating element and the end side of the cell stack.

15. The fuel cell according to claim 1, wherein the planar heating element comprises:
 a heater; and
 a heater support part surrounding at least a portion of the heater.

16. The fuel cell according to claim 15, wherein the heater has a film shape or a plate shape.

17. The fuel cell according to claim 15, wherein the heater support part comprises at least one of metal, ceramic, or an insulating material.

18. The fuel cell according to claim 1, wherein the heating unit is disposed on each of two end sides of the cell stack.

19. A fuel cell, comprising:
 a cell stack comprising a plurality of stacked unit cells;
 a heating unit configured to apply heat to the cell stack;
 an end plate disposed on an end side of the cell stack; and
 a current collector arranged between the end side of the cell stack and the end plate,
 wherein the heating unit comprises:
  a heat-generating part; and
  a heat-generating-part support part disposed on the end side of the cell stack,
 wherein the heat-generating-part support part allows the heat-generating part to be fitted thereinto or to be drawn out therefrom,
 wherein the heat-generating-part support part is arranged between the end side of the cell stack and the end plate, and
 wherein the heat-generating-part support part is arranged between the end side of the cell stack and the current collector.

* * * * *